United States Patent Office 2,930,582
Patented Mar. 29, 1960

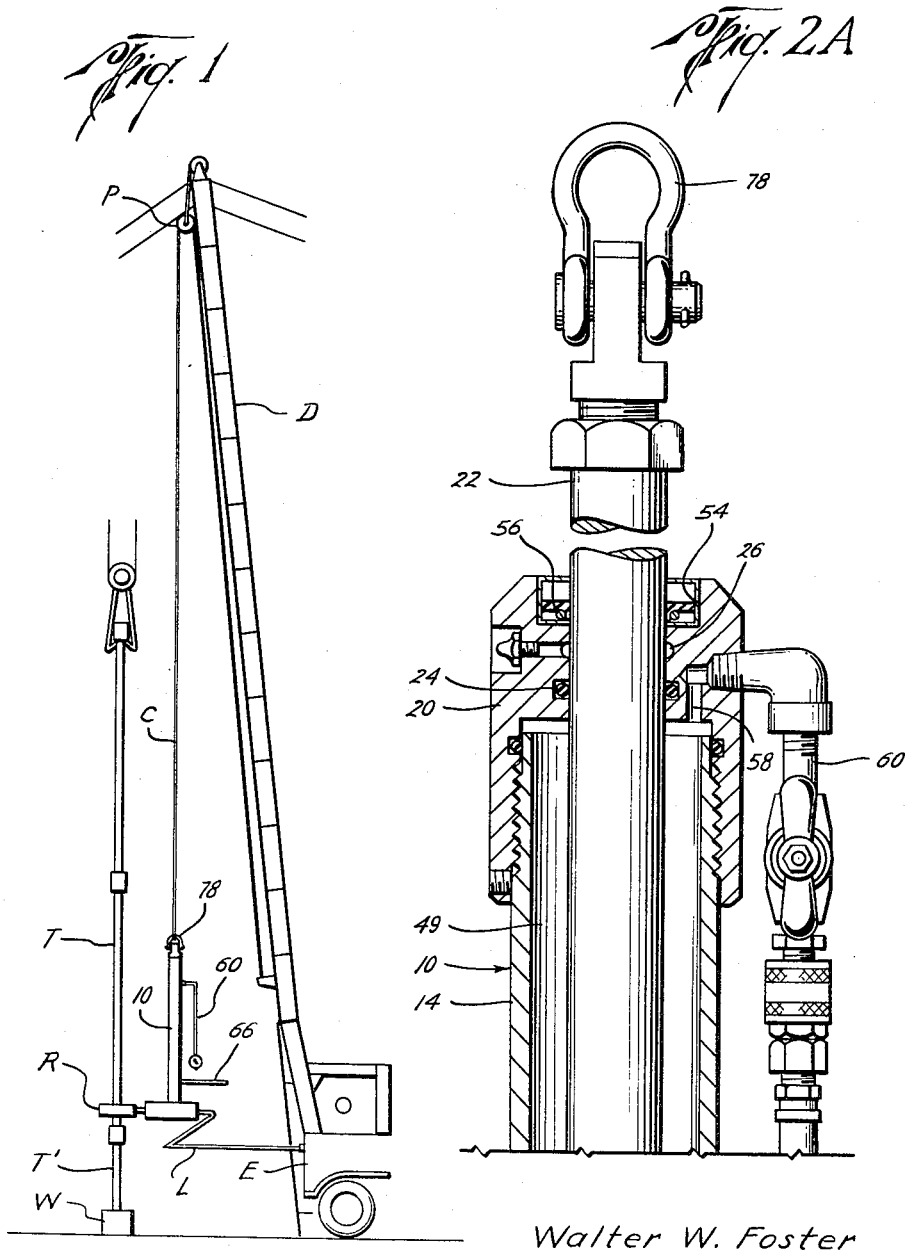

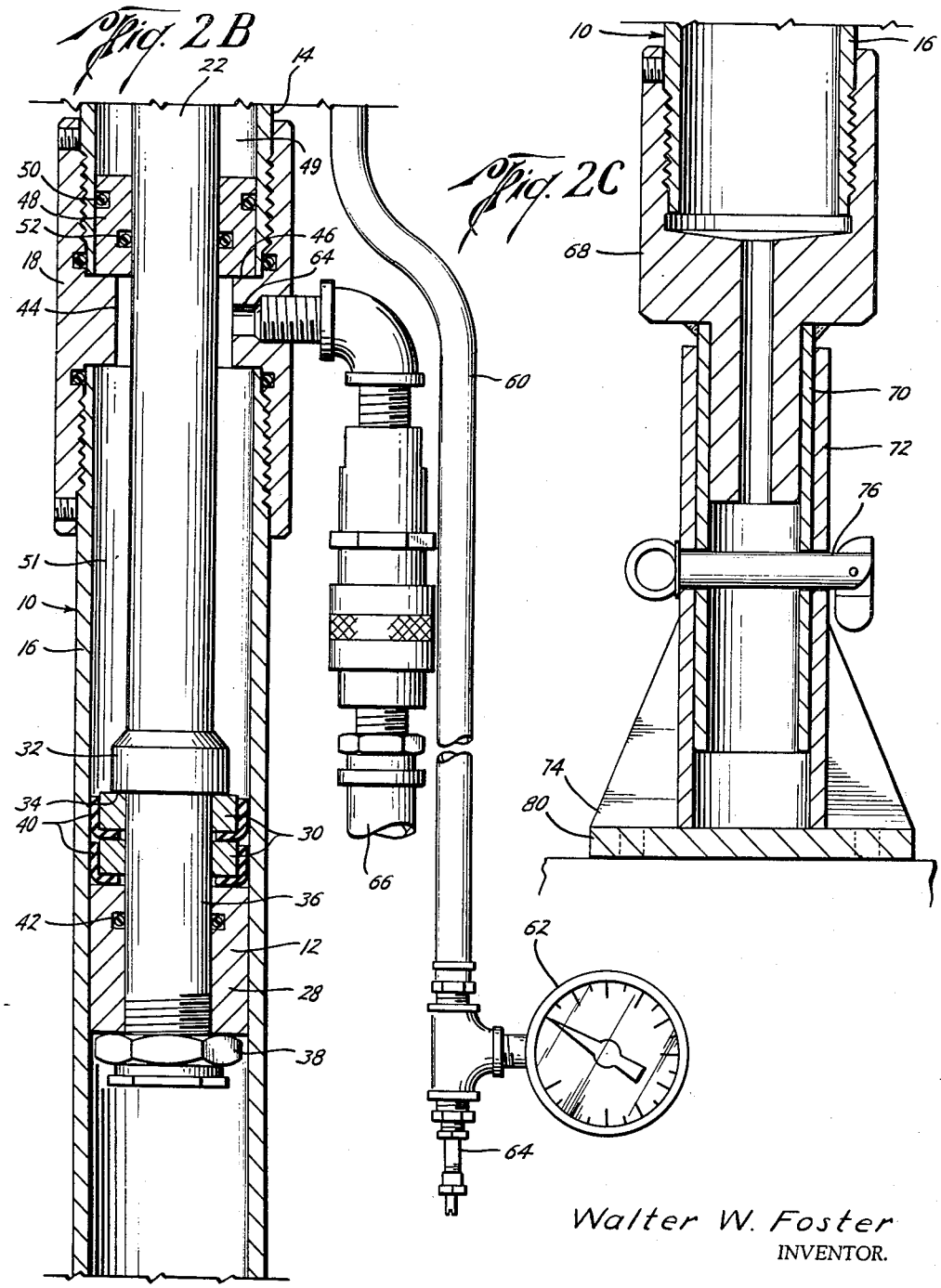

2,930,582

VERTICAL LOAD SUSPENSION AND ADJUSTING MECHANISM

Walter W. Foster, Wichita Falls, Tex.

Application August 26, 1957, Serial No. 680,245

6 Claims. (Cl. 254—93)

This invention relates to vertical load suspension and adjusting mechanism and more particularly to apparatus for suspending a load at an elevation and for adjusting the height at which the load is supported.

While not limited to such use the invention finds particular application in connection with the supporting of machinery, such as hydraulically operated pipe or tubing tong, by suspending the same on a cable from a derrick or other suitable support during the operation of the tong and during the coupling together or disconnecting of sections of pipe or tubing which are to be rotated by the tong.

During the operation of wells such as oil and gas wells it is often necessary for various reasons to remove the tubing from and reinsert the same into the well, and for this purpose power driven tong mechanism is employed for rotating the sections of the tubing to disconnect and reconnect the same. Tubing tongs of this character are usually supported by a cable attached to a derrick or other suitable support, and means must be provided whereby the vertical position of the tong may be quickly and easily adjusted.

Heretofore, it has been customary to employ load balancing mechanism, such as counterweights with apparatus of this character, whereby the tubing tong could be raised and lowered manually to adjust its position during the coupling or uncoupling of the pipe or tubing. Mechanism of this type possesses the disadvantages, among others, that the use of counterweights results in substantially doubling the load which is carried by the cable and derrick; that the tubing tong mechanism must be manually adjusted by lifting or depressing the same, and that variation in the load results in unsatisfactory operation of the counterweights.

The present invention has for an important object the provision of load suspending and adjusting mechanism which is hydraulically operated to adjust the vertical position of the load and which does not substantially increase the load which must be carried by the cable or other suspension means.

Another object of the invention is to provide load suspension mechanism which is easily and quickly operable to adjust the vertical position of the load without the necessity for the use of cable reeling or winding mechanism.

A further object of the invention is the provision of hydraulically operable load suspension mechanism embodying means whereby the weight of the load is resiliently supported.

Another object of the invention is to provide hydraulically operable load suspension equipment having a pressure cylinder and a piston movable therein and including means for introducing hydraulic fluid under pressure into the cylinder to cause relative movement of the cylinder and piston in one direction and means for cushioning relative movement of the cylinder and piston in the other direction.

A further object of the invention is the provision in hydraulically operable load suspension equipment having a pressure cylinder and a piston movable in the cylinder, a movable element in the cylinder and forming one end of an expansible chamber therein, means for introducing pressure fluid into the chamber to yieldingly resist movement of said element in a direction away from said piston and means for introducing hydraulic fluid under pressure into the cylinder between said piston and element to urge the piston in a direction away from said element.

The above and other important objects and advantages of the invention may best be understood from the following detailed description constituting a specification of the same, when considered in conjunction with the annexed drawings, wherein—

Figure 1 is a side elevational view of a preferred embodiment of the invention showing the same as used in connection with the suspension of hydraulically driven tubing tong mechanism; and Figures 2A, 2B and 2C are fragmentary, central, vertical, cross sectional views, on an enlarged scale showing details of construction of the invention, Figure 2B being a downward continuation of Figure 2A, and Figure 2C being a downward continuation of Figure 2B.

Referring now to the drawings in greater detail, the invention is illustrated herein in connection with its application to the suspension of tubing tong mechanism of the type which is hydraulically operated and which is suspended by means of a cable or the like from a suitable support, such as a derrick or crane for use in rotating sections of pipe or tubing to connect or disconnect the same during the insertion of a string of such pipe or tubing in or the removal of the same from a well. It will, of course, be understood, however, that the suspension mechanism of the invention may also be used for other purposes, wherever it may be desired to position a load at a desired location and control the raising and lowering of the same.

The load suspending mechanism of the invention comprises a tubular barrel or casing 10 forming a pressure fluid cylinder within which a piston 12 is movably positioned. The barrel 10 may be made up of upper and lower tubular sections 14 and 16 respectively, suitably coupled together, as by means of a threaded coupling member 18, the upper section 14 having a cylinder head 20 threadably attached to its upper end through which a piston rod or shaft 22 is slidably extended and to which rod the piston 12 is connected. Suitable packing is provided, such as that shown at 24 to form a fluid tight seal between the piston rod and cylinder head. Means is provided, such as the internal groove 26 in cylinder head 20 surrounding the rod 22, into which lubricant may be introduced in the usual manner to lubricate the piston rod.

The piston 12 may be of the removable type having a tubular element 28 and one or more rings or washers 30, and the piston rod may be formed with an external enlargement 32 providing a shoulder 34 and an extension 36 upon which the element 28 and rings 30 are fitted and held in place thereon a nut 38 threadably secured to the extension, one of the rings 30 being in engagement with the shoulder 34. Packing members 40 of the cup type are positioned between the rings 30 and between the element 28 and one of the rings to form a fluid tight seal between the piston and the internal wall of the cylinder. Sealing means, such as that indicated at 42 is also provided in the element 28, in an internal groove provided for that purpose, to form a fluid tight seal between the extension 36 and the element.

The coupling member 18 has an internally reduced portion 44 forming an upwardly facing internal shoulder 46 therein, and within the section 14 above the shoulder 46 a movable member or floating piston 48 surrounds the piston rod 22 for sliding movement thereon, which member engageable with the shoulder to limit downward movement of the member in the cylinder. Suitable sealing means are provided on the member 48, such as those indicated at 50 and 52, positioned to form a fluid tight seal between the member and the exterior of the piston rod and between the member and the interior wall of the cylinder. The floating piston 48 thus defines the lower end wall of an expansible chamber 49 in the cylinder between the floating piston and the cylinder head 20, and also defines the upper end wall of a second expansible chamber 51 in the cylinder between the floating piston and the piston 12.

At its upper end the cylinder has an upwardly opening recess 54 within which suitable packing such as that indicated at 56 is located, surrounding the piston rod 22, to prevent the leakage of lubricant from the groove 26. The cylinder head also has a passageway 58 in communication with the interior of the cylinder at the upper end of the section 14 and with an air inlet pipe 60 having a pressure gauge 62 thereon and whose outer end is provided with an inwardly opening check valve 64 whereby air under pressure may be introduced into the cylinder above the floating piston 48 to urge the piston downwardly in the cylinder.

The coupling member 18 has a passageway 64 which is in communication with the interior of the sections 14 and 16 at a location between the piston 12 and the floating piston 48 and with a hydraulic fluid supply pipe 66 leading to any suitable source of hydraulic fluid under pressure under the control of suitable valve means, not shown, by which the supply of hydraulic fluid to the cylinder is regulated.

At its lower end the section 16 is closed by a cap 68 having a downwardly projecting tubular extension 70 attached thereto, as by welding, and over which a tubular extension 72 on an attaching bracket 74 is fitted. The tubular telescoping extensions are releasably connected together by means of a pin 76 removably extended through registering openings in the extensions whereby the bracket 74 is removably secured to the lower end of the cylinder or barrel.

At its upper end the piston rod 22 is provided with a clevis 78 whereby the rod may be connected to a cable or the like.

In making use of the invention, constructed and arranged as described above, the bracket 74 whose bottom plate 80 is suitably perforated, is bolted or otherwise secured to the frame of hydraulically operated tubing tong mechanism R of conventional design, which is connected to a source of hydraulic fluid under pressure, such as a pump driven by an internal combustion engine E, by means of suitable piping L which may be in the form of flexible hose. The piston rod 22 is connected by the clevis to a cable C which passes over a pulley P carried by a crane or derrick D and is anchored to the latter. Air under pressure is then introduced into the upper section 14 above the floating piston 48 through the inlet pipe 60, until a desired pressure is reached. By then introducing hydraulic fluid under pressure into the cylinder through the supply pipe 66 between the floating piston 48 and piston 12, the floating piston 48 will be moved upwardly until the pressure in the cylinder becomes sufficient to lift the load, whereupon further introduction of hydraulic fluid will cause the barrel or cylinder to move upwardly with the load relative to the piston 12 and rod 22. By permitting an outflow of hydraulic fluid through the pipe 66 the load may then be lowered as desired.

By way of example the invention may be used in connection with the removal or insertion of a tubing string in a well bore, the tubing tong R being suspended by the hydraulically operated load suspension mechanism at a desired location for engagement with a section of a tubing string, such as the section T, to rotate the section T to connect the same to or disconect it from another such section T' which is held stationary by suitable well head equipment W.

By attaching the bracket 74 at a suitable location to the tong R the tong may be suspended in a substantially horizontal, balanced condition, so that it is easily raised or lowered to the desired location.

It will be apparent that the initial pressure of the air in the expansible chamber 49 may be adjusted as desired and is preferably such that upon the introduction of hydraulic fluid under pressure into the chamber 51 the floating piston 48 will be moved upwardly to further compress the air and the expansive force of the air in chamber 49 will then be effective to return hydraulic fluid from the section 14 back through the supply pipe 66 until the floating piston is again seated on the shoulder 46.

The invention thus provides hydraulic lift mechanism of simple design and rugged construction capable of use with numerous different kinds of equipment for the suspension of loads which may vary throughout a wide range.

While the invention has been disclosed herein in connection with a certain specific embodiment of the same, it will be understood that this is intended by way of illustration only, and that various changes may be made in the construction and arrangement of the parts within the spirit of the invention and the scope of the appended claims.

Having thus clearly shown and described the invention, what is claimed as new and desired to secure by Letters Patent is—

1. Load suspension mechanism comprising an elongated tubular body, means for connecting one end of the body to a load to be suspended, a head on the other end of the body having an opening therethrough in communication with the interior and exterior of the body, a piston movably disposed in the body for longitudinal movement therein, a piston rod slidably extended through said opening and connected at its inner end to the piston, means forming a seal between said head and rod, means for connecting the rod at its outer end to a support, a movable element in the body surrounding the rod and movable longitudinally in the body and relative to the rod between the piston and head, means forming a seal between the element and body and between the element and rod, means for introducing a compressible fluid under pressure into the body between the element and head and means for introducing hydraulic fluid into the body between the element and piston.

2. Load suspension mechanism comprising an elongated tubular body, means for connecting one end of the body to a load to be suspended, a head on the other end of the body having an opening therethrough in communication with the interior and exterior of the body, a piston movably disposed in the body for longitudinal movement therein, a piston rod slidably extended through said opening and connected at its inner end to the piston, means forming a seal between said head and rod, means for connecting the rod at its outer end to a support, a movable element in the body surrounding and slidable on the rod and movable longitudinally in the body between the piston and head, means forming a seal between the element and body and between the element and rod, means in the body positioned to be engaged by the element to limit longitudinal movement of the element toward the piston, means for introducing a compressible fluid under pressure into the body between the element and head and means for introducing hydraulic fluid under pressure into the body between the element and piston.

3. Load suspension mechanism comprising an elongated tubular body, means for connecting the lower end of the body to a load to be suspended, a head on the upper end of the body having an opening therethrough in communication with the interior and exterior of the body, a piston movably disposed in the body for longitudinal movement therein, a piston rod slidably extended through said opening and connected at its lower end to the piston, means for connecting the rod at its upper end to a support, means forming a seal between the head and rod, said rod being spaced from the internal wall of the body to form a fluid chamber between the rod and body and between said piston and head, a longitudinally movable element in and dividing the chamber, means for introducing compressible fluid into the chamber above said element and hydraulic fluid into the chamber beneath said element, said element being movable upwardly upon introduction of hydraulic fluid into the chamber to compress the compressible fluid therein to exert a force on the body to move the body and load upwardly relative to the rod.

4. Load suspension mechanism comprising an elongated tubular body, means for connecting the lower end of the body to a load to be suspended, a head on the upper end of the body having an opening therethrough in communication with the interior and exterior of the body, a piston movably disposed in the body for longitudinal movement therein, a piston rod slidably extended through said opening and connected at its lower end to the piston, means for connecting the rod at its upper end to a support, means forming a seal between the head and rod, said rod being spaced from the internal wall of the body to form a fluid chamber between the rod and body and between said piston and head, a longitudinally movably element in and dividing the chamber, means for introducing compressible fluid into the chamber above said element and hydraulic fluid into the chamber beneath said element, said element being movable upwardly upon introduction of hydraulic fluid into the chamber to compress the compressible fluid therein to exert a force on the body to move the body and load upwardly relative to the rod, and downwardly upon expansion of said compressible fluid in the chamber upon downward movement of the body relative to the rod.

5. Load suspension mechanism comprising an elongated tubular body, means for connecting the lower end of the body to a load to be suspended, a head on the upper end of the body having an opening therethrough in communication with the interior and exterior of the body, a piston movably disposed in the body for longitudinal movement therein, a piston rod slidably extended through said opening and connected at its lower end to the piston, means for connecting the rod at its upper end to a support, means forming a seal between the head and rod, said rod being spaced from the internal wall of the body to form a fluid chamber between the rod and body and between said piston and head, a longitudinally movable element in and dividing the chamber, means for introducing compressible fluid into the chamber above said element and hydraulic fluid into the chamber beneath said element, said element being movable upwardly upon introduction of hydraulic fluid into the chamber to compress the compressible fluid therein to exert a force on the body to move the body and load upwardly relative to the rod, and downwardly upon expansion of said compressible fluid in the chamber upon downward movement of the body relative to the rod, and means for limiting such downward movement of said element.

6. Load suspension mechanism comprising an elongated tubular body, means for connecting one end of the body to a load to be suspended, a head on the other end of the body having an opening therethrough in communication with the interior and exterior of the body, a piston movably disposed in the body for longitudinal movement therein, a piston rod slidably extended through said opening and connected at its inner end to the piston, means for connecting the rod at its outer end to a support, means forming a seal between the head and rod, said rod being spaced from the internal wall of the body to form a fluid chamber between the rod and body and between said head and piston, a movable element in the chamber dividing the chamber, means for introducing a compressible fluid into the chamber between said element and head, means for introducing hydraulic fluid into the chamber between said element and piston to apply an upward force to said element and a downward force to said piston to move the element upwardly to compress said compressible fluid and cause said body to move upwardly and for allowing an outflow of hydraulic fluid from the chamber to reduce said forces to allow the body to move downwardly.

References Cited in the file of this patent

UNITED STATES PATENTS

| | | |
|---|---|---|
| 2,470,074 | Manning | May 10, 1949 |
| 2,795,934 | Jenkins | June 18, 1957 |
| 2,795,935 | Fitzgerald | June 18, 1957 |

FOREIGN PATENTS

| | | |
|---|---|---|
| 623,945 | Germany | Jan. 8, 1936 |
| 750,419 | Great Britain | Sept. 20, 1954 |
| 1,082,903 | France | June 23, 1954 |
| 1,126,394 | France | July 23, 1956 |